United States Patent
Lin et al.

(10) Patent No.: US 6,345,319 B2
(45) Date of Patent: Feb. 5, 2002

(54) METHOD FOR INSTALLING PLUG-N-PLAY DEVICE BY COPYING INF FILES TO A CORRESPONDING DIRECTORY AND DELETING DEVICE ID AND ALL RELATED DEVICE CLASS OF AN ORIGINAL DEVICE

(75) Inventors: Kuang-Shin Lin; Tong-S Chen, both of Taipei (TW); Jun Liu, Tianjin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/236,360

(22) Filed: Jan. 25, 1999

(30) Foreign Application Priority Data

Aug. 26, 1998 (TW) .......................................... 87114098

(51) Int. Cl.[7] .............................................. G06F 13/14
(52) U.S. Cl. ............................. 710/8; 710/10; 710/15; 710/17; 710/104; 709/222; 709/321; 707/100
(58) Field of Search ............................... 710/8, 10, 15, 710/17, 104; 709/222, 321; 707/100

(56) References Cited

U.S. PATENT DOCUMENTS

| | | | |
|---|---|---|---|
| 5,555,416 A | * | 9/1996 | Owens et al. ............... 395/712 |
| 5,559,965 A | * | 9/1996 | Oztaskin et al. ............ 710/104 |
| 5,634,075 A | * | 5/1997 | Smith et al. ................... 710/9 |
| 5,655,148 A | * | 8/1997 | Richman et al. ............... 710/8 |
| 5,668,996 A | * | 9/1997 | Radinsky .................... 709/301 |
| 5,748,980 A | * | 5/1998 | Lipe et al. ..................... 710/8 |
| 5,812,820 A | * | 9/1998 | Loram ....................... 395/500 |
| 6,032,201 A | * | 2/2000 | Tillery, Jr. et al. ............. 710/8 |
| 6,092,135 A | * | 7/2000 | Kwon ........................ 710/104 |
| 6,178,468 B1 | * | 1/2001 | Rudd et al. .................... 710/8 |

* cited by examiner

Primary Examiner—Thomas Lee
Assistant Examiner—Abdelmoniem Elamin
(74) Attorney, Agent, or Firm—Bacon & Thomas

(57) ABSTRACT

The present invention relates to a setting method for installation of plug and play device by utilizing the set-up file (INF) of a hardware driver to directly read the device ID of a new device and copy the driver file to the corresponding directory. And, deleting the device ID and all related device class of the original device. Then, while the computer being restarted the Windows system will display that the new device is found and will automatically establish the relationship between the new device and the previously installed driver through the new device ID and class in order to let the new device be operated normally.

5 Claims, 4 Drawing Sheets

METHOD FOR INSTALLING PLUG-N-PLAY DEVICE BY COPYING INF FILES TO A CORRESPONDING DIRECTORY AND DELETING DEVICE ID AND ALL RELATED DEVICE CLASS OF AN ORIGINAL DEVICE

BACKGROUND OF THE INVENTION

The present invention relates to a setting method for installing plug and play device, especially for a plug and play device with a non-WIN95/97198 self-driver. During installation, by adopting the method and procedures of the present invention, said device can operate normally and has the properties of common adaptability, wide application area and simple operation without restriction by the version of computer system.

PRIOR ART OF THE INVENTION

In the present computer system, in regard to a plug and play device with a non-WIN95/97/98 (hereafter abbreviated as WIN95) self-driver, during the installation of WIN95 system, the system will set the non-WIN95 self-driver as an unknown device. After completing the installation of the system, said plug and play device with a non-WIN95 self-driver will not be operated normally. In addition, while some plug and play device being installed under the WIN95 system, the system will prompt to insert the driver magnetic disk for driving said device. If "Uninstall" is selected, the system will not prompt the same again and then merely set said plug and play device as an unknown device. If the WIN95 system has a driver compatible to said device, the installation of said device will be completed automatically after deleting the unknown device from the control desk of the WIN95 system. If there isn't a driver compatible to said device, then said plug and play device cannot be operated through the interface provided by the WIN95 system.

According to the solutions provided by general hardware manufacturers, when installing the WIN95 system, the hardware of said plug and play device with a non-WIN95 self-driver will be pulled out from the computer first. After completing the installation of the WIN95 system, the hardware of said device can then be installed. However, this method is obviously extremely inconvenient and also not safe for non-professional people to pull out said plug and play device from the computer.

Referring to FIG. 4, when the operating system WIN95 being activated the system will automatically search for the plug and play devices installed and compare the ID of each device being searched with the ID stored in the key "Enum" of the index key "Hkey-Local-Machine" in the Registry 60 of the WIN 95 system. If the ID being searched is not found in the key "Enum", then it will be recognized as a new device 40. Then the WIN95 system will prompt to insert the driver 41 of said new device 40 and copy the driver 41 to a corresponding directory 50 and add the device ID 61 and class 62 thereof into the Registry 60 of the WIN 95 system. At the same time, it will establish the corresponding relationship between said new device 40 and said device Class 62. Otherwise, the operating system will recognize that the driver of said new device 40 has already been installed.

The reason why the above mentioned plug and play device cannot be operated normally is that the new device 40 being found by the WIN 95 system at the first time cannot be installed accurately, which will cause the operating system to recognize that the previous installation is correct. Therefore, the device 40 will not work normally and also cannot be modified in the future, even though an attempt is made to adopt the installation of a driver "DDK" provided by Microsoft to copy said driver to Windows\system directory 50 and add the device Class 62 into the data registry 60, or adopt the installation driver of add/remove hardware in the control panel as well as adopting the deletion of unknown device in the System Manager to modify the unknown device, the device 40 still cannot be operated normally.

In view of the various defects found in the above mentioned prior art, the inventor, after spending hard effort for a long time in research and testing, has finally developed and designed the present invention of the setting method in installing plug and play device.

SUMMARY OF THE INVENTION

The object of the present invention is to provide a setting method for installing plug and play device. This method will directly copy the driving and set-up (INF) files to the corresponding directory and delete the device ID and all the related device class of the original hardware device from the data registry of the system. Then when restarting the computer, the Windows system will display that the new device has been found and will automatically establish the correct connecting relationship between the new device and the previous installed driver via the new device ID and Class. Instead of using the traditional method to detect the originally installed driver, the present invention uses the new driver to replace the original driver and modify the corresponding relationship of the new device ID and Class in the data registry of the system and the set-up file (INF). Since Windows system does not provide the software of "modification of Windows set-up file (INF)", the installation of a new device with a non-Win95 self-driver will be very complex in operation. The present invention provides a simple operating procedure and has the properties of common adaptability, wide application area and simple operation, and will not be restricted by the version of computer system. And, at the same time, the present invention can almost be applied to all kinds of plug and play devices.

DETAILED DESCRIPTION OF THE PREFERRED EMBODIMENT

Figure 1:
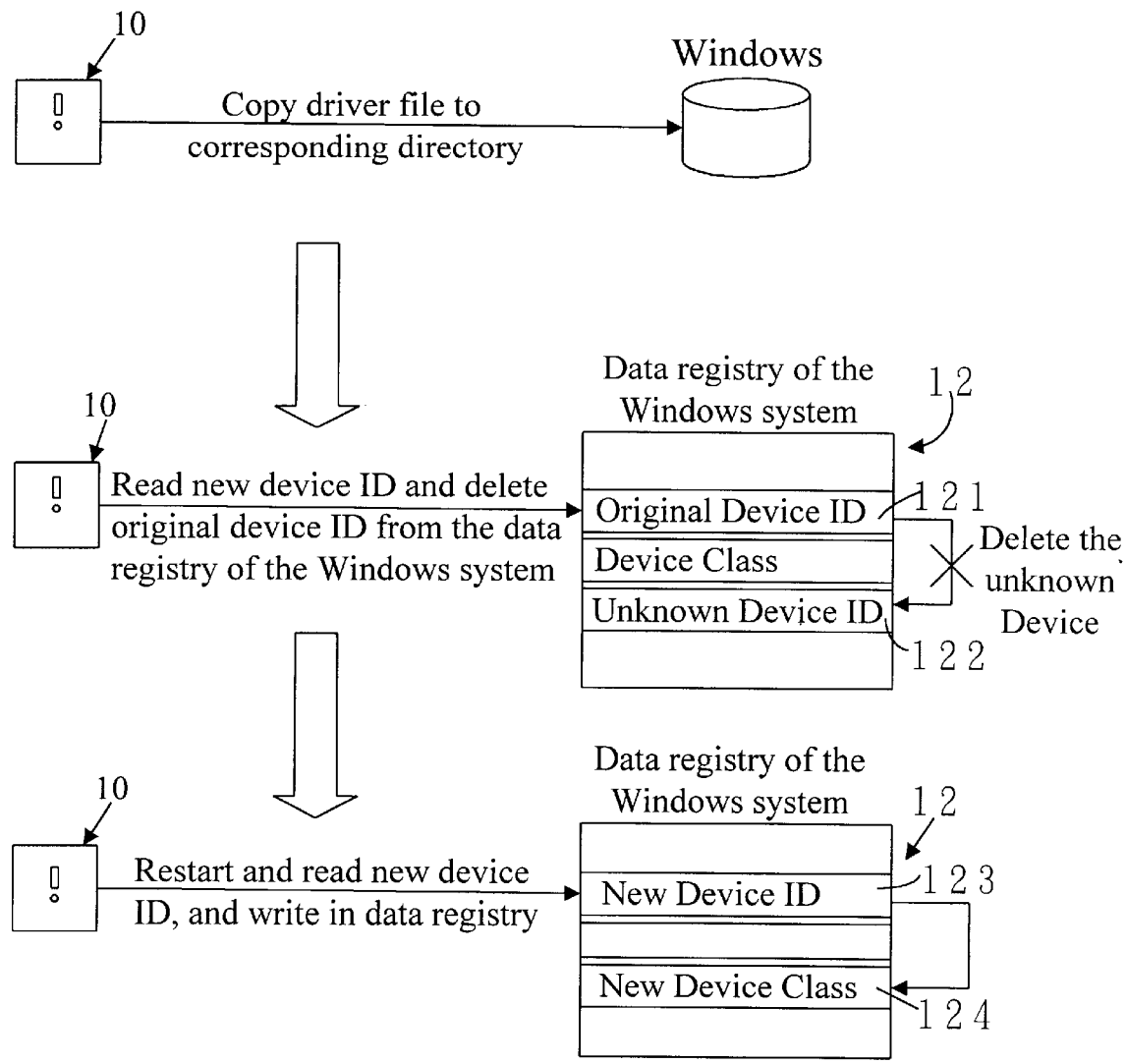
FIG. 1 is the illustration diagram of the data registry of the Windows system according to the present invention.
Figure 2:
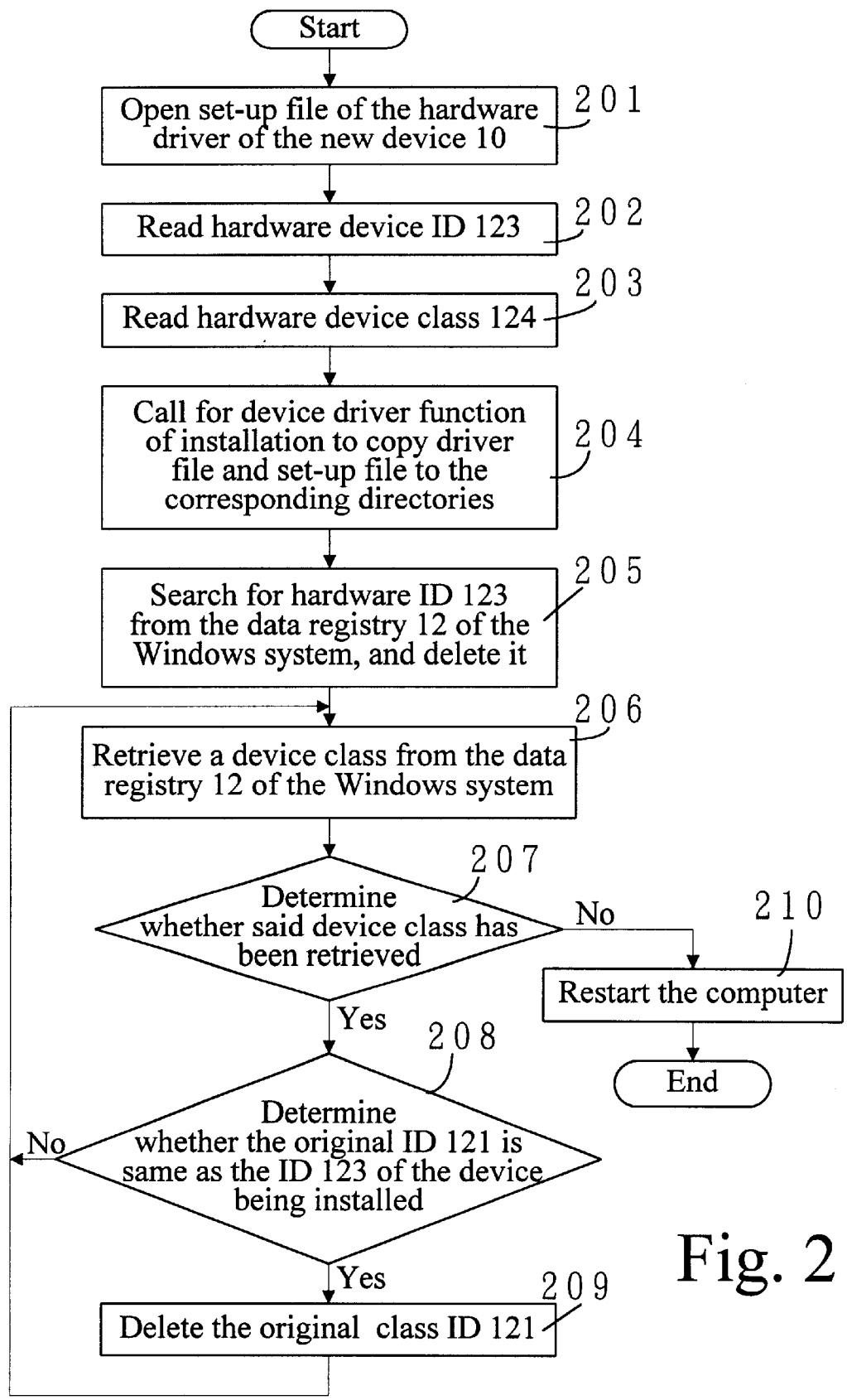
FIG. 2 is the illustration diagram of the basic execution flow according to the present invention.
Figure 3:
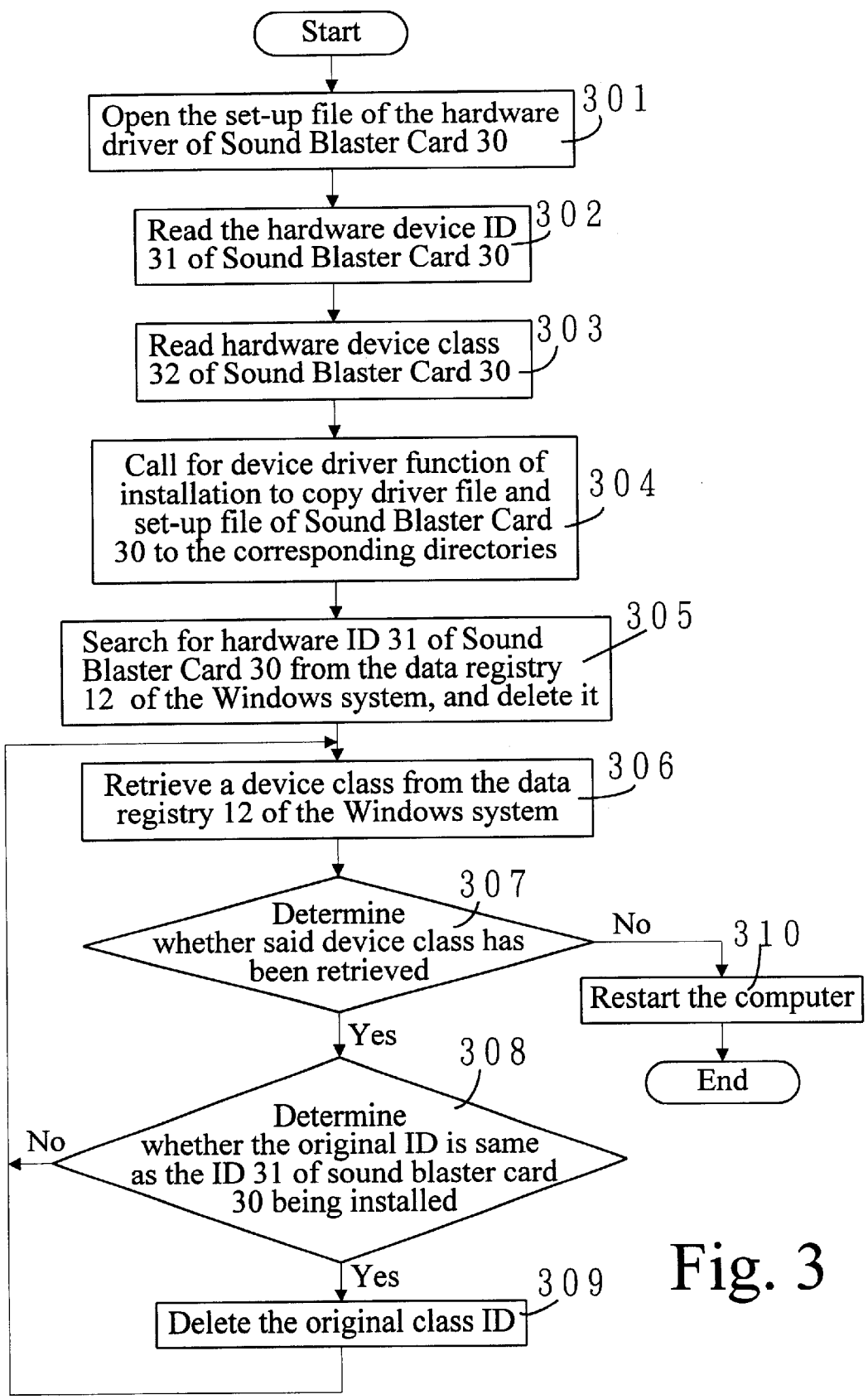
FIG. 3 is the illustration diagram of the execution flow of an embodiment according to the present invention.
Figure 4:
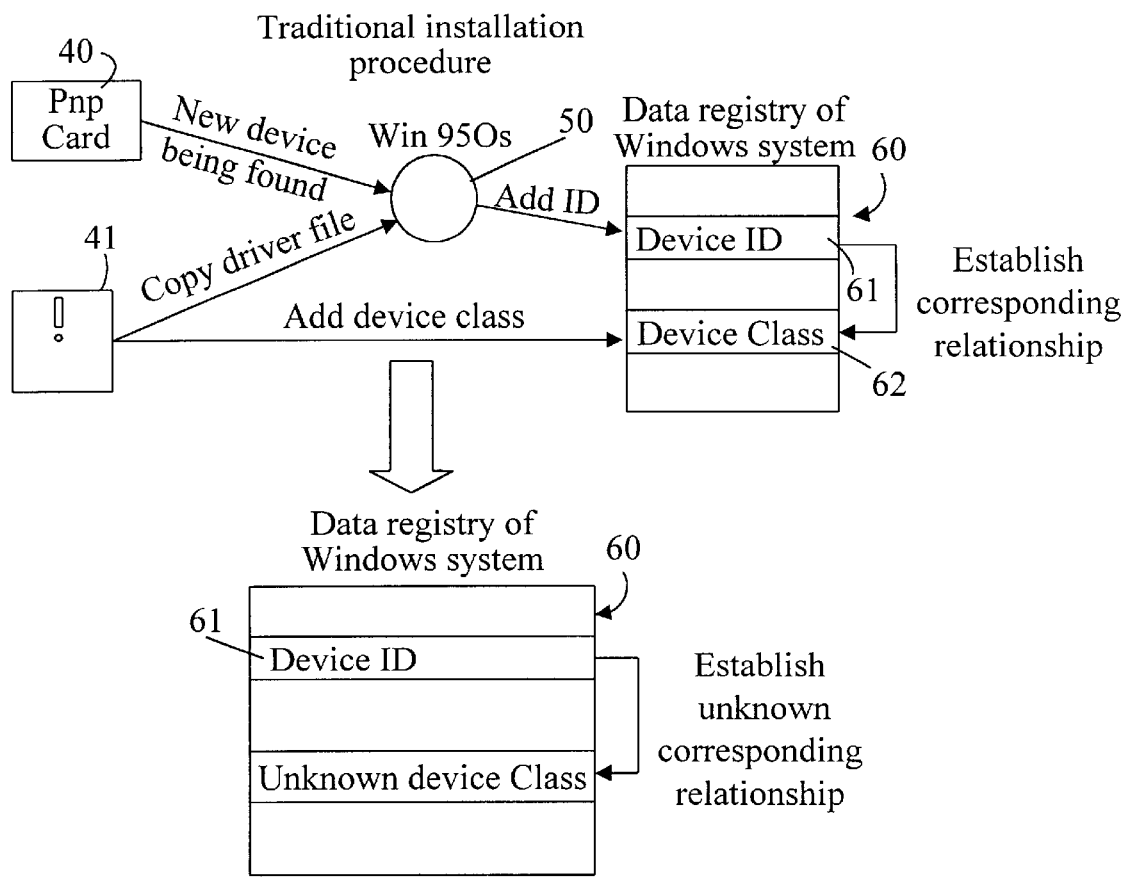
FIG. 4 is the illustration diagram of the data registry of a traditionally used Windows system.

Referring to FIGS. 1, 2 and 3. The present invention is a setting method for installing plug and play device, which is used under the WIN 95/97/98 (thereafter abbreviated as Windows) system to open the set-up file (INF) of the hardware driver of a new device 10. And, directly reading the hardware device ID, copying the driver file to a corresponding directory (as shown in FIG. 1) and then searching for the ID 123 of said new device 10 in the data registry 12 of the Windows system. And, deleting the device ID and all related device class of the original hardware device 121 and the device class of the previous established unknown device 122. At this time, the correct connection between the device ID and Class 124 of the new device 10 will not be established. When restarting the computer, the Windows System will display that the new device 10 is found and will automatically establish the correct connecting relationship of the device ID 123 and device Class 124 of said new device 10 with the previously installed driver. Therefore, said new device 10 can then be operated normally.

Referring to FIG. 2, the computer system executes the procedures of the present invention as follows:

Step 201: Opening the set-up file (INF) of the hardware driver of said new device 10;

Step 202: Reading the hardware device ID 123 from said set-up file (INF);

Step 203: Reading the hardware device class 124 from said set-up file (INF);

Step 204: Calling for device driver function (DDF) of installation and copying the driver file to Windows\system directory and said set-up file (INF) to Windows\INF directory;

Step 205: Searching for the device ID 123 of said new device 10 from the data registry 12 of the Windows system and deleting the original hardware device ID 121;

Step 206: Retrieving one device class from the device classes in the data registry 12 of the Windows system corresponding to the original device ID 121;

Step 207: Determining whether said device class has been retrieved, if there is no other device class to be retrieved, then going to step 210 to restart the computer and end up the installation. After the computer system being restarted, the computer system will automatically establish the accurate connecting relationship between said new device and the previously installed driver through the ID 123 and Class 124 of said new device 10 in order to let said new device 10 be operated normally. If there is one device class being retrieved, then continuing the following steps:

Step 208: Determining whether the original device ID 121 is same as the new device ID 123 which is intended to be installed. If not, then returning to step 206 to continue the steps until retrieving all device classes sequentially;

Step 209: If the original device ID 121 is same as said new device ID 123, then deleting said original device ID 121 and returning to step 206 to continue the steps until retrieving all device classes sequentially.

The following is an embodiment by using a Pentium series computer installed with a Sound Blaster Card 30 of a PRO chip to execute the method of the present invention, as shown in FIG. 3:

Step 301: Opening the set-up file of the hardware driver of said Sound Blaster 30 (the name of said set-up file is OEMSETUP.INF);

Step 302: Reading the device ID 31 from said set-up file (OEMSET.INF) of said Sound Blaster Card 30 (in this embodiment the device ID of said Sound Blaster Card 30 is PROXXXXXX);

Step 303: Reading the device Class 32 from said set-up file (OEMSET.INF) of said Sound Blaster Card 30 (in this embodiment the device class of said Sound Blaster Card 30 is MEDIA);

Step 304: Calling for driver procedure function (DDK) of installation. In this embodiment, using the function named DiInstall to copy the driver file of said Sound Blaster Card 30 to Windows\system directory and copy OEMSETUP.INF to Windows\INF directory;

Step 305: Searching for the device ID 31 of said Sound Blaster Card 30 from the data registry 12 of the Windows system and deleting the original hardware device ID;

Step 306: Retrieving a device class from the device classes in the data registry 12 of the Windows system corresponding to the original device ID;

Step 307: Determining whether said device class has been retrieved, if there is no other device class to be retrieved, going to step 310 to restart the computer and end up the installation of said new device. After the computer system being restarted, the computer system will automatically establish the accurate connecting relationship between said new device and the previ-ously installed driver through said ID 31 and Class 32 in order to let said Sound Blaster Card 30 be operated normally. If there is a device class being retrieved, then continuing the next step;

Step 308: Determining whether the original device ID is same as said device ID 31 of the Sound Blaster Card 30 which is intended to be installed. If not, then returning to step 306 to continue the steps until retrieving all device classes sequentially;

Step 309: If the original device ID is same as said device ID 31, then deleting said original device ID and returning to step 306 to continue the steps until retrieving all device classes sequentially.

As presented in the foregoing description, the present invention herein has been described in term of a preferred embodiment, which shall not be construed as a limitation of the patented scope claimed by the present invention. Furthermore, while individuals skilled in the art can easily achieve adaptation or other similar modifications thereof based on the technological content in the disclosure of the present invention, such derivations shall remain within the protected scope of the present invention

What is claimed is:

1. A setting method for installing plug and play device, said method including the following steps enabling a computer system to be installed with a new device:

(1) opening set-up file (INF) of a hardware driver of said new device;

(2) reading the new device ID from said set-up file (INF);

(3) reading the new device class from said set-up file (INF);

(4) calling for device driver function (DDK) of installation to copy new driver file of said new device and said set-up file respectively to corresponding directories;

(5) searching for the device ID of said new device from a data registry of Windows system and deleting the original device ID;

(6) retrieving a device class from the device classes in the data registry of the Windows system corresponding to the original device ID;

(7) determining whether said device class has been retrieved, if there is no other device class to be retrieved, then going to restart the computer and end up the installation of said new device, and then automatically establishing the accurate connection relationship between said new device and the previously installed driver through the ID and class of said new device in order to let said new device be operated normally; if there is a device class being retrieved, then continuing the next step;

(8) determining whether the original device ID is same as said new device ID intended to be installed, if not, then returning to step (6) to continue the steps until all device classes have been retrieved;

(9) if the original device ID is same as said new device ID, then deleting the original device ID and returning to step (6) to continue the steps until all device classes have been retrieved.

2. A method according to claim 1, wherein said new device is a plug and play device.

3. A method according to claim 1, wherein said new device is a Sound Blaster Card.

4. A method according to claim 1, wherein said new driver file may be copied to the system directory in the Windows system.

5. A method according to claim 1, wherein said set-up file (INF) may be copied to the INF directory in the Windows system.

* * * * *